United States Patent [19]
Lederer

[11] Patent Number: 5,564,880
[45] Date of Patent: Oct. 15, 1996

[54] SHELF STORAGE SYSTEM

[75] Inventor: Jürgen Lederer, Reichenschwand, Germany

[73] Assignee: Siemens Aktiengesellschaft, Munich, Germany

[21] Appl. No.: 343,514

[22] PCT Filed: May 24, 1993

[86] PCT No.: PCT/DE93/00452

§ 371 Date: Dec. 5, 1994

§ 102(e) Date: Dec. 5, 1994

[87] PCT Pub. No.: WO93/25458

PCT Pub. Date: Dec. 23, 1993

[30] Foreign Application Priority Data

Jun. 5, 1992 [DE] Germany .............. 9207669 U

[51] Int. Cl.⁶ .................................................. B65G 1/04
[52] U.S. Cl. .................................. 414/280; 414/661
[58] Field of Search ............................ 414/280, 286, 414/661

[56] References Cited

U.S. PATENT DOCUMENTS

| | | |
|---|---|---|
| 3,547,282 | 12/1970 | Hartbauer . |
| 3,901,547 | 8/1975 | Skinner, II .................. 294/88 |
| 4,358,239 | 11/1982 | Dechantsreiter .................. 414/661 |
| 4,556,355 | 12/1985 | Glater .................. 414/280 |
| 4,812,102 | 3/1989 | Smith et al. .................. 414/280 |
| 4,856,956 | 8/1989 | Zur .................. 414/280 |
| 4,943,199 | 7/1990 | Hiller .................. 414/280 X |
| 5,120,101 | 6/1992 | Vranish .................. 294/119.1 |
| 5,213,463 | 5/1993 | Rothlisberger et al. .......... 414/661 X |

FOREIGN PATENT DOCUMENTS

| | | | |
|---|---|---|---|
| 0461735 | 12/1991 | European Pat. Off. . | |
| 2299247 | 8/1976 | France . | |
| 2743395 | 12/1978 | Germany | 414/280 |
| 3324349 | 11/1984 | Germany . | |
| 3612008 | 10/1986 | Germany | 414/280 |
| 3633508 | 4/1988 | Germany | 414/280 |
| 8807944.9 | 9/1988 | Germany . | |
| 1175810 | 8/1985 | U.S.S.R. | 414/280 |
| 1450963 | 1/1989 | U.S.S.R. | 414/280 |
| 1481145 | 5/1989 | U.S.S.R. | 414/280 |

*Primary Examiner*—David A. Bucci
*Attorney, Agent, or Firm*—Kenyon & Kenyon

[57] ABSTRACT

In a storage container (L) which is supposed to be automatically pushed into shelf compartments and pulled out of them by a handling device, notches (E) are provided in a gripping zone and are structured in such a way that a stud (B) of a gripper mechanism of the handling device can be brought into engagement in physically locking and/or force-locking fashion in each instance.

25 Claims, 3 Drawing Sheets

SHELF STORAGE SYSTEM

BACKGROUND OF THE INVENTION

The present invention relates to a shelf storage system with a storage container that has a gripping zone for a handling device designed for pulling and pushing the storage container, where the gripping zone is affixed on at least one frontal end of the storage container and has a notch at both sides, which is structured in such a way that a stud of the handling device can be brought into engagement in physically locking and/or force-locking fashion in each instance.

In shelf storage systems, particularly in high-shelf storage facilities, it is usual to place and remove storage containers in a fully automatic manner. For this purpose, so-called shelf manipulation devices are used as handling devices; these can be moved to any desired shelf compartment and have a gripping and activation mechanism with which the storage containers can be pushed into or pulled out of the shelf compartment in question.

In a shelf system according to DE patent 33 24 349, a gripping device for the storage container consists of plates which are compressed in a complicated manner and thereby grasp the storage containers from the side. In addition to the great effort for the gripping mechanism, there is another disadvantage in that a container picked up at a slant will be put down at a slant again, so that tolerances can add during movements.

European patent application 04 61 735, proposes to solve this problem, each storage container having an open slit guide for a carrier on its frontal end facing the shelf manipulation device, which guide projects out of an endless carrier pulling element which is guided around deflection wheels, the distance between which is at least as long as the insertion depth of the storage container into the compartments of the shelf.

In this device, however, there is the possibility that the synchronicity between the two carriers is not absolutely guaranteed and/or that the pulling mechanism, including carriers, has an amount of play that cannot be avoided with the design, so that it cannot be precluded that the storage container will be tipped when handled by the shelf manipulation device. Another disadvantage consists of the fact that a tilted position of the storage container as compared with the gripping mechanism, i.e., the carriers can result in incorrect engagement of the carriers in the slit guides, so that secure handling of the storage containers is not guaranteed. Since the slit guides must have sufficient play with regard to the carriers to guarantee the intended guidance function without any problems, the carriers can only enter into a physical lock with the slit guides in the pulling or pushing direction, but first the play has to be overcome. Tilting of a storage container around its longitudinal and/or lateral axis can have the result, in this device, that one or both carriers jump out of the slit guide. These possible disadvantages can particularly occur if shelf systems are being manipulated where static deviations of the geometrical conditions can occur due to their size and the stresses which occur.

SUMMARY OF THE INVENTION

The present invention overcomes these problems in the prior art by providing a shelf storage system of the type stated initially in such a way that it can be securely handled by a specially designed end element of a gripping mechanism.

This task is accomplished by the fact that each stud has a thickened region on at least one end, and that the notches are narrower at the engagement point than the thickened region. This ensures that the storage container can be handled without tilting, also with regard to its lateral and longitudinal axis.

By the interaction of the notches with a correspondingly shaped stud, the handling of the storage container can be further improved. The shape of the stud can be selected in such a way, in this instance, that it already enters into a force lock with the notches at its engagement point, so that a torque around one axis or around several axes is compensated by the force lock.

If the stud which has engaged with the notch still has play at the engagement point, with regard to the notch, the physical lock with regard to a tilting movement of the storage container around its lateral and/or longitudinal axis can be produced, according to an advantageous further development of the invention, by the fact that each stud is narrowed from its ends towards the middle. If the dimensions of the notch are coordinated with the dimensions of the stud in this way, the notch enters into a physical lock with the stud at the thickened region if the storage container is tilted, possibly after a planned play, predetermined by the stud dimensions, has been overcome, so that further tilting is prevented.

A double-cone stud is particularly simple and efficient, but other shapes are also possible, such as a stud which narrows in a curve towards the middle. This guarantees that the notches cannot slip off the stud either towards the top or towards the bottom. Likewise, in the case of a double-cone stud, the notches can be structured in V-shape, but can be rounded off towards the pointed end.

It is advantageous in this connection that the notch is automatically brought to the middle of the stud, if the stud first engages with a thicker end. This achieves horizontal alignment of the storage container.

A simple, advantageous further development of the stud consists of the fact that the stud has a projecting final part at its top end, which is structured in plate shape in a particularly simple embodiment, for example in the form of a hammer head or as an additionally applied plate.

Another advantageous further development of the present invention consists of the fact that the notches are made in a horizontal plate affixed to the top edge of the frontal end of the storage container. This has the result, on the one hand, of a free space relative to the footprint of the storage container, i.e., the footprint of the storage container is not made larger by the plate, so that there are no additional disadvantages resulting from a larger footprint (such disadvantages would be, for example, the danger of jamming on conveyor belts, a greater area for weighing devices that must be provided, etc.). In addition, the plate can simultaneously be used as an easy to grasp carrying handle, if the storage container has to be moved by hand.

Since in most instances the storage containers are brought onto a conveyor system by the handling device before or after manipulation by the handling device, where it can happen that one storage container bumps against the next one, it is advantageous if the horizontal plate has a bumper edge. This prevents the storage containers from being pushed onto each other at their plates, and thus causing conveyor problems.

To avoid damage to the notches, it is practical to bead their edges. At the same time, this increases the force lock between the double-cone stud and the notches. In a more complicated form of the invention, the edges of the notches can also be rounded off in such a way that horizonal alignment of a storage container slightly tipped around its longitudinal axis is facilitated when the studs engage.

There is a particularly good interplay between the storage container and the studs in that the studs can be activated via a gripper mechanism.

BRIEF DESCRIPTION OF THE DRAWINGS

An embodiment of the invention is explained in greater detail in the following, on the basis of the drawing. This shows.

DETAILED DESCRIPTION

Figure 1:
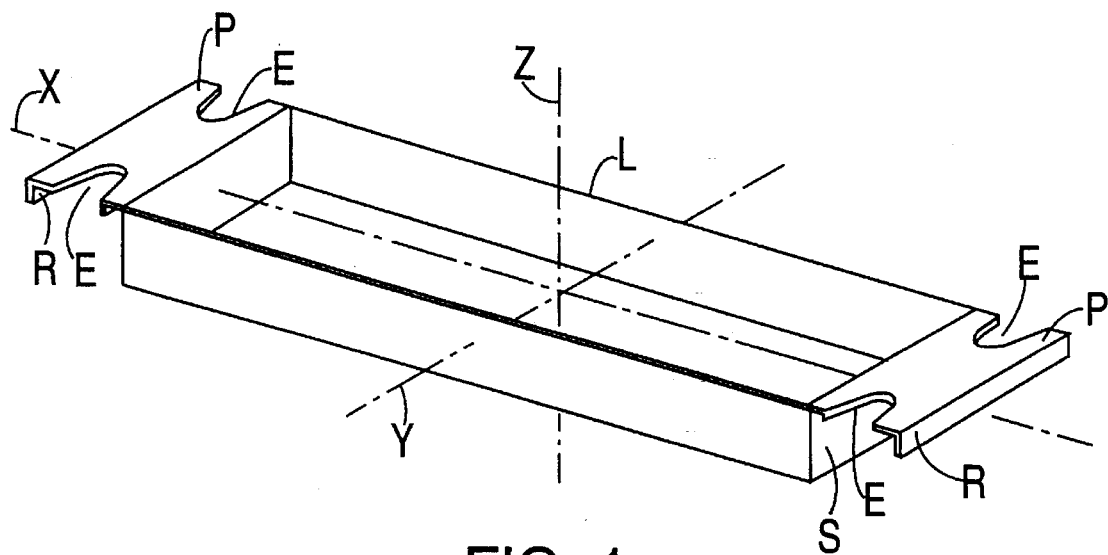
FIG. 1 illustrates a storage container with a gripping zone.

FIG. 1 shows a three-dimensional representation of a storage container L with its longitudinal axis X, its lateral axis Y and its vertical axis Z. The storage container serves to hold any desired bulk goods. At both frontal ends S of the storage container L, a horizonal plate P is affixed in each instance, at the two sides of which V-shaped notches E are provided, which are rounded off towards their tip. The edges of the notches E as well as the outer edges R of the horizontal plates P are beaded or angled. The edges of the notches can also be rounded off, for example.

The beading or rounding of the edges of the notches serves the purpose, on the one hand, that the edges remain stable in shape even when gripped many times, and, on the other hand, that the physical lock and/or force lock with the engaging stud is increased. The beaded regions, i.e., the bumper edges R at the ends of the plates P are supposed to prevent the storage containers L from overlapping with their plates, if several storage containers L are pushed together.

Figure 2:
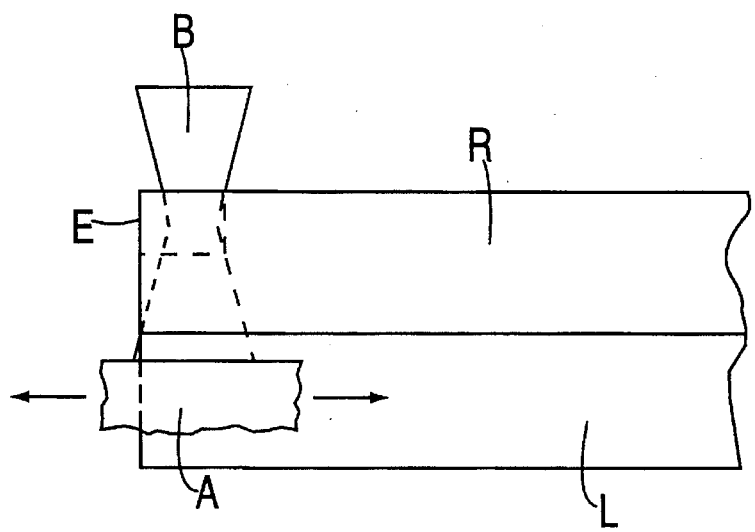
FIGS. 2 to 5 illustrate various embodiments of a stud in engagement with a notch.
Figure 3:
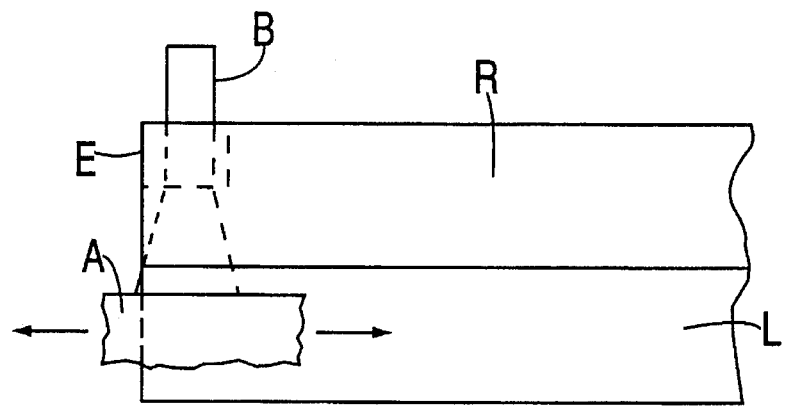
Figure 4:
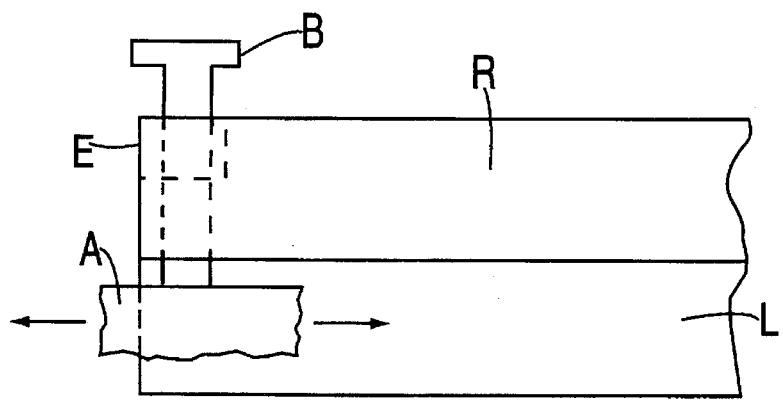
Figure 5:
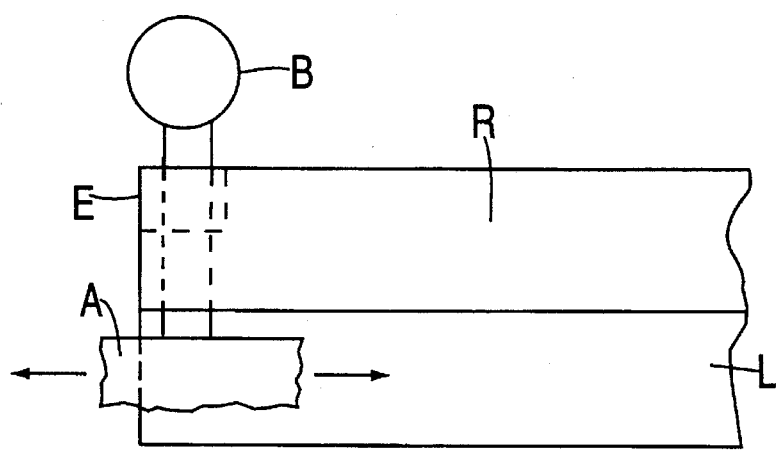

FIG. 2 shows an embodiment of a stud B, which is thicker at both ends than in its middle portion. The thickened region results from a double-cone shape. The double-cone stud B is the end link of a gripping mechanism which is shown schematically in FIG. 6. It is mounted on a movable carrier A and engages with the notch E of the storage container L, where only the left part of the front view of the storage container L is shown. The double cone B is structured in size in such a way that it can still securely engage with the notches E if the storage container is rotated around its lateral axis Y or its longitudinal axis X by a permissible dimension. The double-cone shape guarantees that in the most disadvantageous case, further tilting of the storage container is precluded, and in the desired normal case, the notches E can slip to the thinnest part of the stud, and thus the storage container is aligned in optimum manner once again.

In FIGS. 3 to 6, further embodiments of the stud B are shown. The stud according to FIG. 3 has a truncated cone shape at its bottom end, so that a movement of the notch towards the bottom is prevented. The stud according to FIG. 4 has a plate-shaped structure in the form of a hammer head at its top end. Instead of the hammer head formation, a plate that is additionally affixed can also be provided. The stud according to FIG 5 has a cone-shaped thickened region at its top end.

Figure 6:
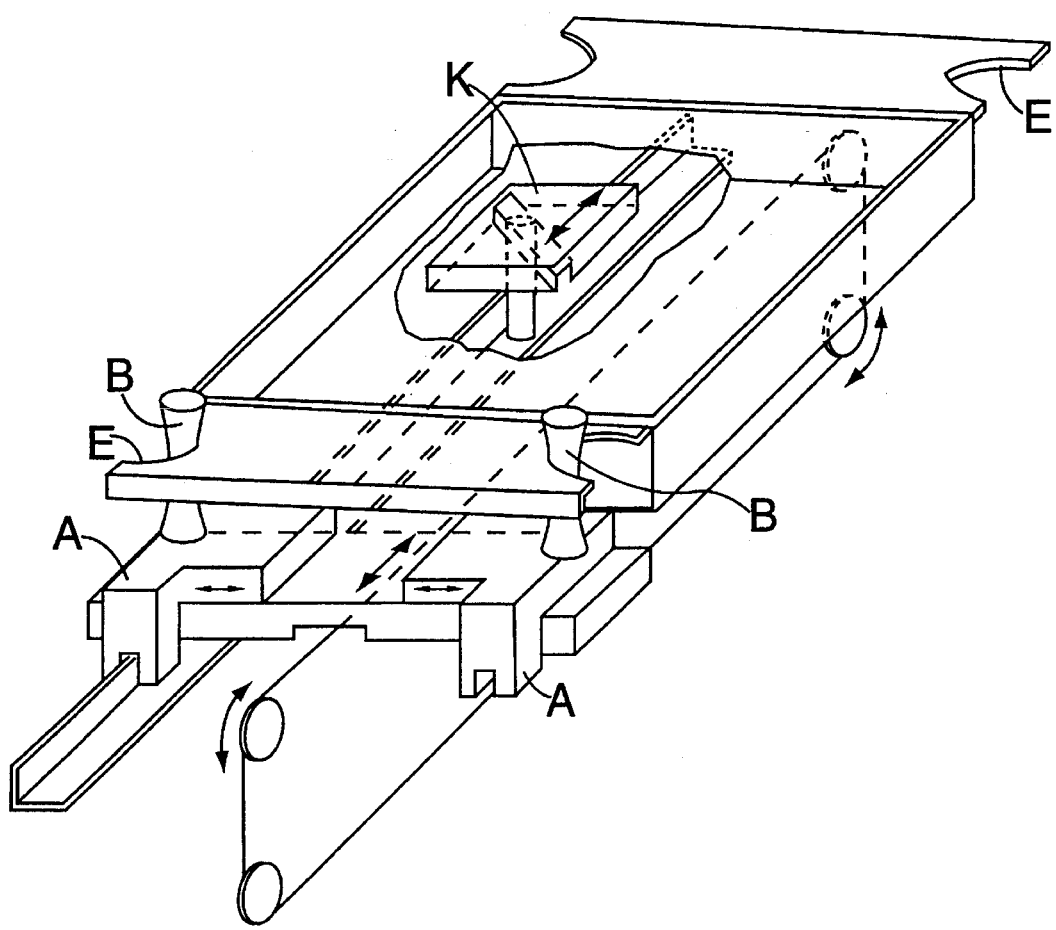
FIG. 6 illustrates a gripper mechanism of a shelf manipulation device.

In order to allow secure handling, free of play, a rigid gripping mechanism such as the one shown schematically in FIG. 6 is used. In this connection, two gripper arms A wich are guided on rails are opened and closed by means of an adjustable rocker slide K, where the gripper arms A including the rocker slide K can be moved on a table of the shelf manipulation device, not shown, so that the storage container can be pulled onto the shelf manipulation device or pushed off it after engagement of the studs B attached to the gripper arms A into the notches E of the storage container L. The notches E are drawn on a larger scale in the representation, in comparison with the studs B, so that the shape of the notches, which is rounded in this case, is more clearly evident.

I claim:

1. A shelf storage system with a storage container and a handling device structured to push and pull the storage container comprising: a gripping zone affixed on at least one frontal end of the storage container, said gripping zone having a notch on both sides, wherein the handling device includes a plurality of studs, each stud having a thickened region on at least one end, wherein each notch is structured in such a way that said stud of the handling device can be brought into engagement in physically locking and/or force-locking fashion and the notch is narrower at the engagement point than the thickened region.

2. The shelf storage system of claim 1, wherein each stud is narrowed from its ends towards a middle portion.

3. The shelf storage system of claim 2, wherein each stud has a double-cone shape.

4. The shelf storage system of claim 3, wherein said notches have a "V" shape and are rounded off towards pointed part of the "V" shape.

5. The shelf storage system of claim 1, wherein each stud has a final part which projects beyond a circumference of the stud at its top end.

6. The shelf storage system of claim 5, wherein said final part has a shape of a plate.

7. The shelf storage system of claim 1, wherein said notches are made in a plate affixed horizontally at a top edge of the frontal end of the storage container.

8. The shelf storage system of claim 2, wherein said notches are made in a plate affixed horizontally at a top edge of the frontal end of the storage container.

9. The shelf storage system of claim 3, wherein said notches are made in a plate affixed horizontally at a top edge of the frontal end of the storage container.

10. The shelf storage system of claim 4, wherein said notches are made in a plate affixed horizontally at a top edge of the frontal end of the storage container.

11. The shelf storage system of claim 5, wherein said notches are made in a plate affixed horizontally at a top edge of the frontal end of the storage container.

12. The shelf storage system of claim 7, wherein said horizontal plate has a bumper edge.

13. The shelf storage system of claim 8, wherein said horizontal plate has a bumper edge.

14. The shelf storage system of claim 11, wherein said horizontal plate has a bumper edge.

15. The shelf storage system of claim 1, wherein the edges of said notches are beaded.

16. The shelf storage system of claim 5, wherein edges of said notches are beaded.

17. The shelf storage system of claim 12, wherein edges of said notches are beaded.

18. The shelf storage system of claim 1, wherein edges of said notches are rounded off.

19. The shelf storage system of claim 5, wherein edges of said notches are rounded off.

20. The shelf storage system of claim 12, wherein edges of said notches are rounded off.

21. The shelf storage system of claim 27, wherein said studs can be activated via a gripper mechanism.

22. The shelf storage system of claim 5, wherein said studs can be activated via a gripper mechanism.

23. The shelf storage system of claim 12, wherein said studs can be activated via a gripper mechanism.

24. The shelf storage system of claim 15, wherein said studs can be activated via a gripper mechanism.

25. The shelf storage system of claim 18, wherein said studs can be activated via a gripper mechanism.

\* \* \* \* \*